US012675590B2

(12) United States Patent
Asati et al.

(10) Patent No.: US 12,675,590 B2
(45) Date of Patent: Jul. 7, 2026

(54) DATA SECURITY AT CLOUD SCALE

(71) Applicant: Cisco Technology, Inc., San Jose, CA (US)

(72) Inventors: Rajiv Asati, Morrisville, NC (US); Akram Ismail Sheriff, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 250 days.

(21) Appl. No.: 18/345,254

(22) Filed: Jun. 30, 2023

(65) Prior Publication Data

US 2025/0005184 A1    Jan. 2, 2025

(51) Int. Cl.
| | |
|---|---|
| *G06F 21/62* | (2013.01) |
| *G06F 9/54* | (2006.01) |
| *H04L 9/40* | (2022.01) |
| *H04L 45/7453* | (2022.01) |

(52) U.S. Cl.
CPC ............ *G06F 21/6218* (2013.01); *G06F 9/54* (2013.01); *H04L 45/7453* (2013.01); *H04L 63/104* (2013.01)

(58) Field of Classification Search
CPC ... G06F 21/6218; G06F 9/54; H04L 45/7453; H04L 63/104
See application file for complete search history.

(56) References Cited

U.S. PATENT DOCUMENTS

| | | | | |
|---|---|---|---|---|
| 9,602,482 | B1 * | 3/2017 | Roth ....................... | H04L 63/08 |
| 2011/0060920 | A1 * | 3/2011 | Kisters .................... | H04L 9/002 |
| | | | | 726/19 |
| 2013/0329584 | A1 * | 12/2013 | Ghose .................... | H04L 49/70 |
| | | | | 370/252 |
| 2016/0328817 | A1 | 11/2016 | Yin et al. | |
| 2017/0111336 | A1 * | 4/2017 | Davis ..................... | H04L 67/10 |
| 2017/0295236 | A1 * | 10/2017 | Kulkarni ............. | H04L 67/1097 |
| 2018/0041336 | A1 | 2/2018 | Keshava et al. | |
| 2018/0288025 | A1 | 10/2018 | Poliashenko et al. | |
| 2020/0344211 | A1 * | 10/2020 | Katz ................... | H04L 63/0236 |
| 2021/0248017 | A1 | 8/2021 | Hinrichs et al. | |
| 2022/0292190 | A1 | 9/2022 | Subbarayan et al. | |

OTHER PUBLICATIONS

Nambiar, A, et al., "An Overview of Data Warehouse and Data Lake in Modern Enterprise Data Management," Big Data Cogn. Comput., https://doi.org/10.3390/bdcc6040132, Nov. 7, 2022, 24 pages.
Anomalo, "Complete Data Quality Platform," retrieved from https://www.anomalo.com, on Jun. 20, 2023, 9 pages.

(Continued)

*Primary Examiner* — Abdulkader M Alriyashi
(74) *Attorney, Agent, or Firm* — Edell, Shapiro & Finnan, LLC

(57) ABSTRACT
A method to protect data in a database. The method includes detecting an actual flow path for an API call between a source node and a destination node, determining whether the actual flow path for the API call deviates from an expected flow path for the API call, and in response to determining that the actual flow path for the API call deviates from the expected flow path by a predetermined threshold, denying access to data sought by the API call at the destination node.

20 Claims, 9 Drawing Sheets

DETECT AN ACTUAL FLOW PATH FOR AN API CALL BETWEEN A SOURCE NODE AND A DESTINATION NODE — 802

DETERMINE WHETHER THE ACTUAL FLOW PATH FOR THE API CALL DEVIATES FROM AN EXPECTED FLOW PATH FOR THE API CALL — 804

IN RESPONSE TO DETERMINING THAT THE ACTUAL FLOW PATH FOR THE API CALL DEVIATES FROM THE EXPECTED FLOW PATH BY A PREDETERMINED THRESHOLD, DENY ACCESS TO DATA SOUGHT BY THE API CALL AT THE DESTINATION NODE — 806

(56)                    References Cited

OTHER PUBLICATIONS

Globenewswire, "Anomalo to Offer Deep DataObservability on Google BigQueryThrough Partnership With GoogleCloud," https://www.globenewswire.com/news-release/2022/10/12/2533231/0/en/Anomalo-to-Offer-Deep-Data-Observability-on-Google-BigQuery-Through-Partnership-With-Google-Cloud.html, Oct. 12, 2022, 4 pages.

Monte Carlo, [New Report] Wakefield Survey Results—The State of Data Quality, 2023, "Monte Carlo Brings Data Observability to Data Lakes with New Databricks Integration," https://www.montecarlodata.com/blog-monte-carlo-brings-data-observability-to-data-lakes-with-new-databricks-integration/, Aug. 2, 2022, 6 pages.

Watts, S., "Data Observability Explained: How Observability Improves Data Workflows," SPLUNK, Blogs, Learn, https://www.splunk.com/en_us/blog/learn/data-observability.html, Aug. 4, 2022, 12 pages.

Beswick, J., AWS Compute Blog, Amazon, "Using AWS X-Ray tracing with Amazon EventBridge," https://aws.amazon.com/blogs/compute/using-aws-x-ray-tracing-with-amazon-eventbridge/, Mar. 2, 2021, 11 pages.

Kiesewetter, C., Dynatrace, "Dynatrace Grail: The data lakehouse for observability and security analysis and automation," https://www.dynatrace.com/news/blog/why-you-need-a-data-lakehouse/, Apr. 4, 2023, 13 pages.

Ashare, M., "Cloud delivers data—too much, for most companies," CIODIVE, Dive Brief, https://www.ciodive.com/news/data-overload-CIO-challenge-automation/632077/, Sep. 16, 2022, 3 pages.

Dorneanu, D., et al., "Build secure encrypted data lakes with AWS Lake Formation," AWS Big Data Blog, https://aws.amazon.com/blogs/big-data/build-secure-encrypted-data-lakes-with-aws-lake-formation/, Jun. 4, 2021, 17 pages.

* cited by examiner

| API CALL FLOW PATH | SRC_ARN_ID | INTERVENING_ID_1 | INTERVENING_ID_2 | INTERVENING_ID_3 | DEST_ARN_ID |
|---|---|---|---|---|---|
| API_FLOW_1 | Ox0000FF: LINK EXECUTION TIME | Ox001234A: EXECUTION TIME | Ox001234B: LINK EXECUTION TIME | Ox001234C: LINK EXECUTION TIME | Ox00AAB123 |
| API_FLOW_2 | " | " | " | " | " |
| API_FLOW_3 | " | " | " | " | " |
| API_FLOW_4 | " | " | " | " | " |

FIG.2

| INTERNAL API CALL FLOW PATH BASED SIGNATURE DERIVATION (CIPHER TEXT) | DECISION ANALYSIS <ACTUAL_DATA CONTENT: Private_Key_P1: Private_Key_P2> | DRIFT % COMPARED TO FINGERPRINT (WRITE) | DRIFT % COMPARED TO FINGERPRINT (READ) | DATA ACCESS "WRITE" ACTION | DATA ACCESS "READ" ACTION |
|---|---|---|---|---|---|
| BI USER (ROLE)⟶ IAM POLICY⟶ TABLE 'A' ⟶ COLUMN :4 - CIPHER TEXT IS DERIVED AND STORED IN CLOUD AS ADDITIONAL METADATA FOR THIS FIELD OF DATA | DATA TAMPERED | 90% | 10% | DENY | ALLOW |
| STUDENT USER (ROLE)⟶ IAM POLICY⟶ TABLE 'A' ⟶ COLUMN :4 -CIPHER TEXT IS DERIVED AND STORED IN CLOUD AS ADDITIONAL METADATA FOR THIS FIELD OF DATA | DATA TAMPERED | 80% | 40% | DENY | DENY |
| DATA ANALYST (ROLE)⟶ IAM POLICY⟶ TABLE 'A' ⟶ COLUMN :4 -CIPHER TEXT IS DERIVED AND STORED IN CLOUD AS ADDITIONAL METADATA FOR THIS FIELD OF DATA | DATA_NOT_TAMPERED | 6% | 5% | ALLOW | ALLOW |
| ML ENGINEER (ROLE)⟶ IAM POLICY⟶ TABLE 'A' ⟶ COLUMN :4 -CIPHER TEXT IS DERIVED AND STORED IN CLOUD AS ADDITIONAL METADATA FOR THIS FIELD OF DATA | DATA TAMPERED | 80% | 12% | DENY | DENY |

DATA SECURITY AT CLOUD SCALE

TECHNICAL FIELD

The present disclosure relates to data security, and more particularly to enhancing data security at the column, row, or cell level of a database or table stored in a cloud environment.

BACKGROUND

Presently, if the content of a data entry record present in a database, table or column is meant to be accessible/modifiable by a persona of a user (e.g., a data analyst with a specific Role-Based Access Control (RBAC) policy) is, in fact, accessed by another persona of a user who does not have the appropriate credentials, a security threat could be possible. For example, the content of the data entry record could be a customer's Personally Identifiable Information (PII), a revenue metric, or some other internal software state metric, and that content could be improperly modified, even in an unintentional or inadvertent way. This type of role escalation-based data security threat may be manifested in different forms in real-world production systems. And, in a large-scale production system, it is often difficult to detect or track whether content in a given record of a table has been modified, or which persona of user, or which actual user, might have modified the record. This kind of data security threat is often not detectable using full stack application (FSO) observability products. In general, data security observability is not the same as application state observability.

BRIEF DESCRIPTION OF THE DRAWINGS

FIG. 2 is a table illustrating an API call flow that is leveraged by multi-level security logic, according to an example embodiment.

FIG. 3 is a table illustrating results of API call flow analysis executed by multi-level security logic, according to an example embodiment.

DETAILED DESCRIPTION

Overview

A method to protect data in a database. The method includes detecting an actual flow path for an API call between a source node and a destination node, determining whether the actual flow path for the API call deviates from an expected flow path for the API call, and in response to determining that the actual flow path for the API call deviates from the expected flow path by a predetermined threshold, denying access to data sought by the API call at the destination node.

In another embodiment, a device is provided. The device includes an interface configured to enable network communications, a memory, and one or more processors coupled to the interface and the memory, and configured to detect an actual flow path for an API call between a source node and a destination node, determine whether the actual flow path for the API call deviates from an expected flow path for the API call, and in response to determining that the actual flow path for the API call deviates from the expected flow path by a predetermined threshold, deny access to data sought by the API call at the destination node.

Example Embodiments

Figure 1:
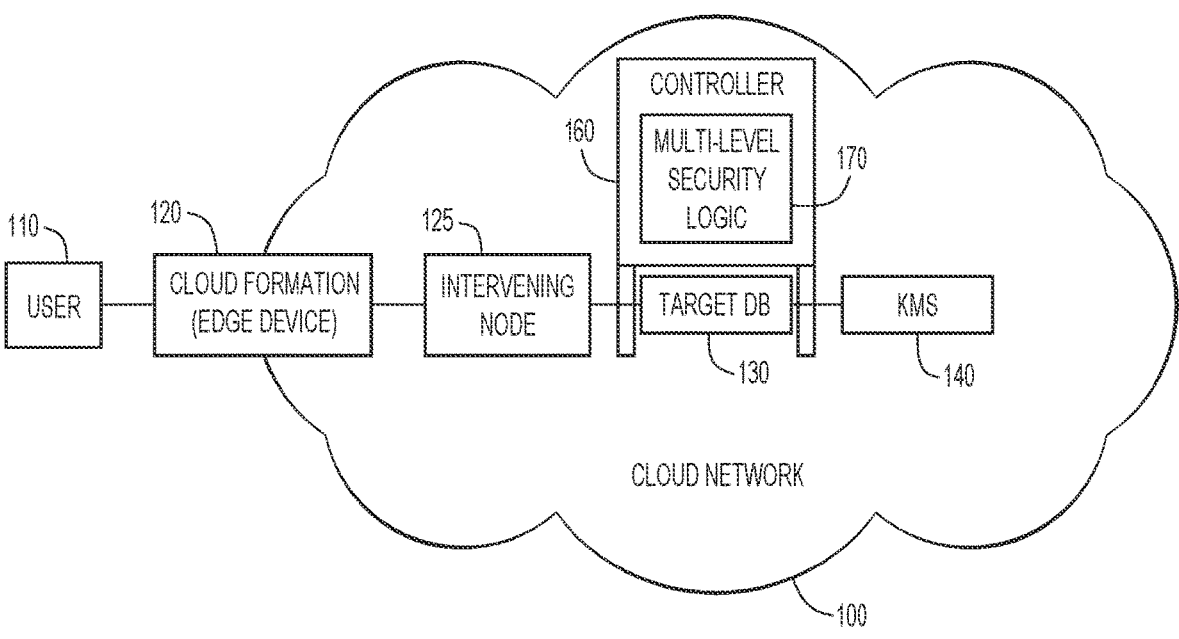
FIG. 1 shows a cloud network topology including a controller hosting multi-level security logic, according to an example embodiment.

FIG. 1 shows a cloud network topology including a controller hosting multi-level security logic, according to an example embodiment. More specifically, FIG. 1 depicts a cloud network 100 including a cloud formation or edge device 120, an intervening node 125 (of which there may be multiple), a target database 130, a key management service (KMS) 140, and a controller 160, which hosts multi-level security logic 170. In one possible use case, a user 110 may want to read data from, or write data to, target database 130.

As will be explained in detail below, multi-level security logic 170 is configured to apply one or more security techniques before allowing user 110 to access, via an API call, target database 130 and read and/or write data from/to target database 130. The security techniques include one or more of (1) Application Programming Interface (API) call path flow fingerprinting and drift analysis, (2) API call path flow based private key derivation, and (3) Identity and Access Management (IAM), Role-Based Access Management (RBAC) and/or Attribute Based Access Control (ABAC) policies.

In many cloud implementations each resource is given a resource name ID (RN_ID). A directional mapping of such RN_ID from the user 110, e.g., a SRC_RN_ID (who could have a persona such as a Business Intelligence (BI) user, Machine Learning (ML) Engineer, Data scientist, etc.) all the way to a destination resource, e.g., a DEST_RN_ID, creates a single API call flow path. An example of such a call flow path would pass through edge device 120, possibly other intervening nodes including intervening node 125, and ultimately to target database 130.

As shown in FIG. 1, controller 160 may be configured to function as a "security wrapper" to protect access to target database 130. Controller 160, and multi-level security logic 170, may be configured to consume incoming read/write API calls, analyze their respective API call flow paths including respective timestamps, and allow or deny access to target database 130 based on one or more of the security techniques noted above.

Over a period of time, controller 160, and more particularly, multi-level security logic 170, may be configured to build a database or a heatmap of what a genuine or expected internal API call flow path would look like to access a particular resource (e.g., target database 130) from user 110 (as well as other users (not shown)).

Detected API call flow paths that do not match with the generated heatmap or "fingerprint" as derived by multi-level security logic 170 could be flagged as anomalous, and redirected, e.g., to an administrator, for further deeper analysis.

A predetermined threshold of a static value or a dynamic threshold value could be used to determine anomalous behavior, i.e., an unexpected call flow path. An unexpected call flow path may be considered as a deviation or "drift" from normal, and it may thus be advisable to analyze such API calls, and base access to target database 130 on how far a given API call flow path deviates or drifts from a "normal" or expected API call flow path fingerprint.

In one possible embodiment, as a given API call flow path extends between every "Caller" and "Callee" service or cloud component, a small value could be added at every "service-hop," e.g., intervening node 125. A resulting cumulative score from different services for a given API call could thus result in a final score for the given API call flow path.

In one possible implementation, each RN_ID may be an Alphanumeric or a Hexadecimal value (e.g., SRC_RN_ID/ user 110 could be enumerated as #0000FF).

Similarly, the destination RN_ID of the service, i.e., DEST_ARN_ID could also be assigned a unique value. Intervening nodes could likewise be assigned unique values. Ultimately, a directional mapping table may be generated for each API call flow path, as shown in FIG. 2.

A timestamp at which every invocation of an interim service occurs ("link execution time," as indicated in FIG. 2) from the Caller to the Callee all the way from source to destination may be captured. Each link's timestamp gives an indication as to how much time on an average it takes for a given function (or functions) to execute on respective nodes along the API call flow path. If a Role escalation attack is occurring, a threat actor might consume more time to, e.g., embed malicious code. Longer execution time, especially at particular nodes, along the API call flow path may facilitate anomaly detection with the API call flow fingerprint database or heatmap.

An API call flow path may be a value derived from the unique node values and timestamp information. That is, a predetermined hash, considered an "expected flow path" could be generated for each API call flow path, and for each persona.

FIG. 3 is a table illustrating results of API call flow path analysis executed by multi-level security logic 170, according to an example embodiment. As shown, a drift percentage of an expected call flow path measure is indicated for a given API call by individual personas (e.g., BI user, student user, Data Analyst, or ML engineer). If the read or write API call flow path drift is greater than a predetermined percentage (and thus considered, perhaps, anomalous), then read and/or write access to, e.g., target database 130 is denied. On the other hand, if the read or write API call flow path drift is less than a predetermined percentage, then read and/or write access to, e.g., target database 130 is allowed. In an embodiment, the drift analysis is performed in real time as API calls are executed and intercepted by multi-level security logic 170. Data (i.e., ciphertext) representative of the expected flow path, for each persona, may be stored as metadata in, e.g., each field or cell of a database in target database 130, as indicated in the first column of the table of FIG. 3.

In an embodiment, and based on the API call flow path, multi-level security logic 170 may be configured to execute reverse lookup/traceback analysis to stitch different session identifiers of each API call to identify the "user" who accessed, or attempted to access, data in target database 130.

By using, e.g., "custom trace header attributes" such as Caller ID, Callee ID, Event Trigger_ID, etc., in a Request packet of an API call, a reverse lookup may be performed to identify if the user who accessed the data via a specific API call flow path is an authorized user, or is malicious.

The described API call flow path drift analysis may be performed by multi-level security logic 170 in real time for multiple API calls (to enable time series correlation) and to identify the source user who is attempting to access the data.

It is noted that if a hacker or threat actor attempts a Role escalation attack, then the API call flow path could deviate from the expected call flow path. Based on a correlation percentage analysis of a given API call flow path, it can be deduced that there may be an 'abnormal' path via which the incoming read or write API call may have traveled.

In an embodiment, the API call flow path fingerprint (e.g., a hash, a concatenated value, etc.) may be stored as metadata along with the data in target database 130, perhaps on a per cell basis. Then, the incoming API call flow path fingerprint may be used as another operand in the decision-making process for logical access to the data in target database 130. In this way, target database 130 itself maintains information used to allow/deny access such that multi-level security logic 170 can focus on processing, as opposed having to store significant amounts of data.

As another layer of protection against unauthorized access to target database 130, the value (e.g., the generated hash, concatenated value, etc.) that is associated with an API call flow path (i.e., the fingerprint, hash value, ciphertext) may be used as a private key (or as input into a key generation mechanism) for encrypting the actual data present in a given field of target database 130. As shown in FIG. 3, if a user accesses a given field without the proper key, then the access may be designated as "data_tampered." If the proper key is used, then the access may be designated as "data_not tampered."

More specifically, in an embodiment, data to be stored in a specific cell or field (Row*Column) of target database 130 may be encrypted using keys derived from a value associated with an API call flow path, i.e., the API call flow path fingerprint (hash value, ciphertext, etc.). In an alternative embodiment, and as shown in FIG. 4, data can also be split into multiple objects and stored in target database 130.

Figure 4:
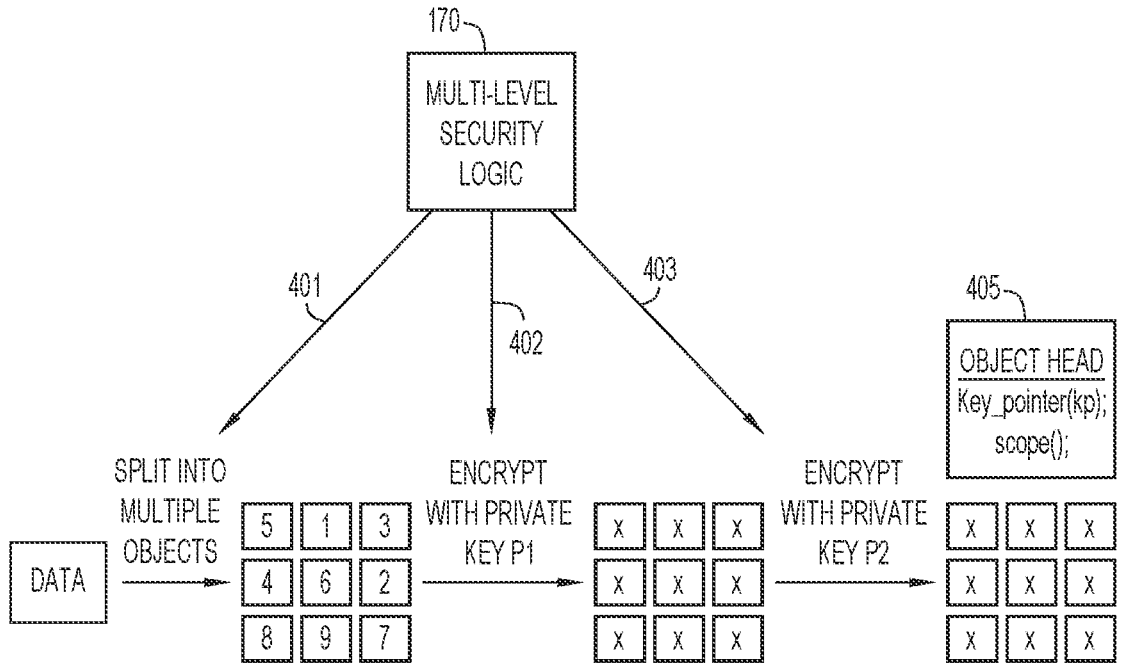
FIG. 4 illustrates encryption techniques executed in conjunction with multi-level security logic, according to an example embodiment.

As shown in FIG. 4, multi-level security logic 170 may be configured to encrypt data in target database 130 using one or more private keys, e.g., private key p1 (a read cipher) and private key p2 (a write cipher). In the implementation shown, data may be split into multiple objects at 401, encrypted at 402 using private key p1, and further encrypted at 403 with private key p2.

Private key p1, and private key p2 could be derived by passing the API call flow path fingerprint to a public key infrastructure (PKI), elliptic curve cryptography (ECC) mechanism, or some other hashing technique to derive a unique key.

Multi-level security logic 170 may upload the relevant public key to a centralized controller (not shown) in cloud network 100.

In an embodiment, a key_pointer (kp) (to the relevant public key), sequence of the objects, and a scope (local or embedded data), may be injected into an object head 405 and exchanged with multi-level security logic 170 or some other entity. The object head may be considered a small program that can execute with minimal overhead.

The scope is used to limit where the data can be successfully decrypted. For example, the scope can be as granular as a specific "data access card" within a server where target database 130 is hosted, or a specific data server in a storage area network (SAN), or within a virtual private cloud (VPC) or within a Data center, region, country, etc.

The entire block (object+head) may then be encrypted with private key p2. In one possible embodiment, private key p2 may be generated using a "timer based private key distribution (KD) function."

In an embodiment, the actual data that is being protected in target database 130 and the derived keys are stored in a feature store so that even if the feature data is exposed to a data security threat, the adversary cannot get the context or access to original data present in target database 130. In one possible implementation, dynamic data redaction could be triggered to conceal the data and also to render the actual split data un-usable.

Figure 5:
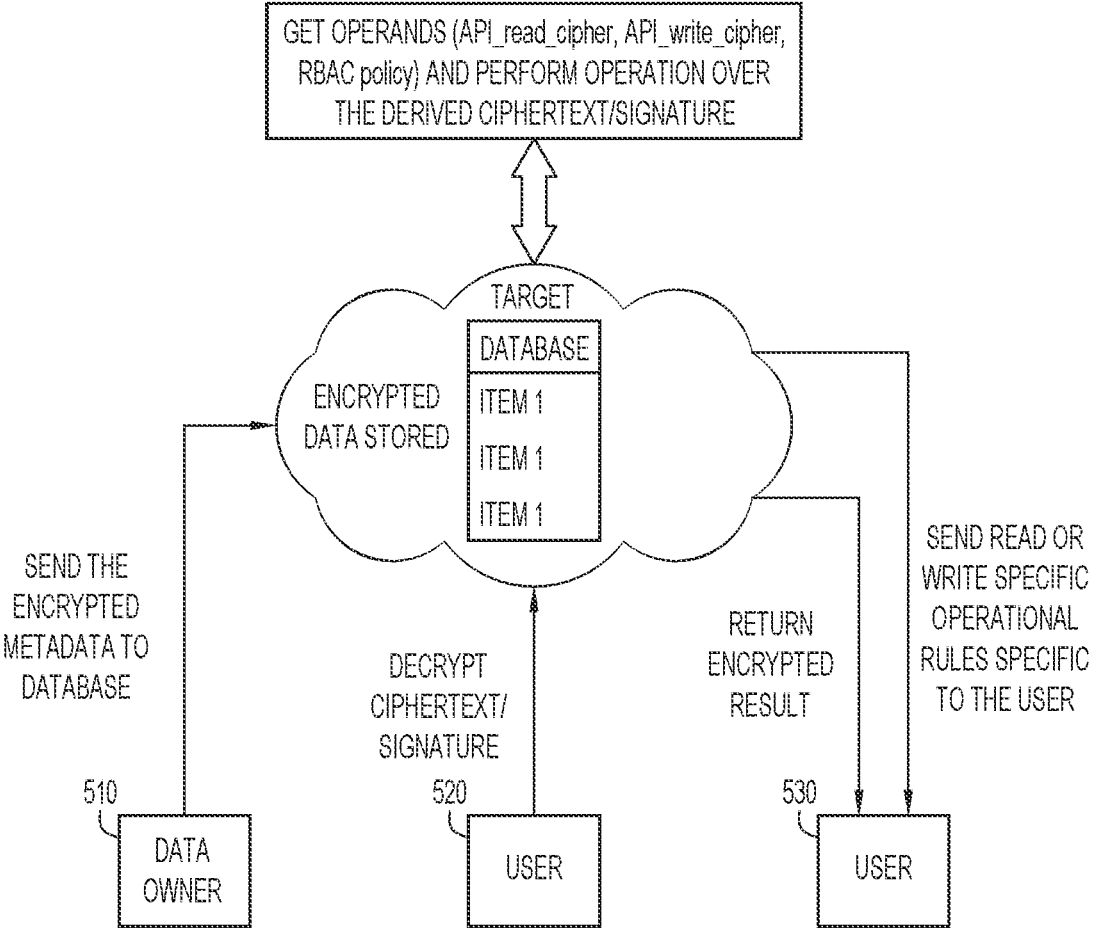
FIG. 5 illustrates how different users may access a cloud database given protections provided by multi-level security logic, according to an example embodiment.

FIG. 5 illustrates how different users may access a cloud database given protections provided by multi-level security logic 170, according to an example embodiment. As shown, a data owner 510 may store encrypted metadata (e.g., an API call flow path fingerprint), and user 520 and user 530 may seek to access target database 130. FIG. 5 describes which persona of a user has access to the data and which persona of a user does not have access to the data. More specifically, user 520 may request to Decrypt an incoming API read call to target database 130 (Row, Column, Field/Cell) that has encrypted data stored as per the encryption logic described above. If the incoming API call's encryption key operand does not match, then the data cannot be decrypted. That is, only specific users (e.g., BI, data scientist or other user as per RBAC, ABAC policy) granted by an administrator would have access to the data. In this case, user 520 has the right set of encryption keys, which would be used to decrypt the data, but user 530 does not have the right set of encryption keys used to decrypt the data.

As yet another layer of protection against unauthorized access to target database 130, a unique signature may be assigned to a genuine/legitimate user who has access to a particular field/Column in target database 130 according to IAM, RBAC, ABAC, and/or a static security policy definition. This signature can be stored along with the other metadata described above and stored in association with a respective field in target database 130. Note that FIG. 3, in the first column, shows the use of an IAM policy along with use of ciphertext (i.e., keys based on API call flow path fingerprints, hash values, etc.) to make a final determination as to whether to allow or deny access to a given field or fields in target database 130.

Figure 6:
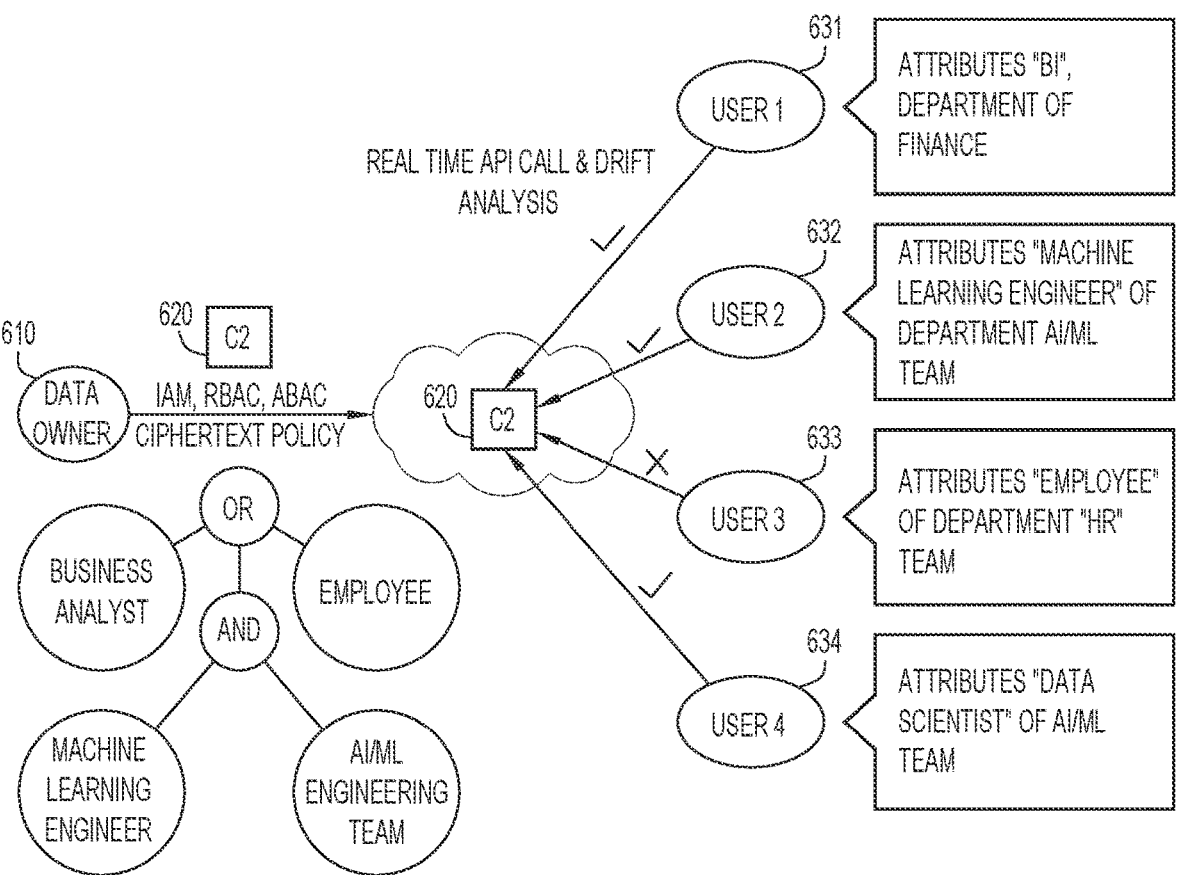
FIG. 6 illustrates the use of AND and OR operations in connection with permitting access to a cloud database under the control of multi-level security logic, according to an example embodiment.

In this regard, FIG. 6 illustrates the use of AND and OR operations, using such a unique signature, in connection with permitting access to a cloud database under the control of multi-level security logic 170, according to an example embodiment. As shown, data owner 610 causes encrypted content 620 to be stored in the cloud, e.g., in target database 130. Encryption may be in accordance with keys derived from an API call flow path fingerprint, as explained previously. As each user 631, 632, 633, 634 attempts to gain access to encrypted content 620 a series of AND and OR operations may be performed by multi-level security logic 170 on the access request to confirm that the appropriate user persona has access rights to the data. In some cases, access will be allowed (e.g., for users 631, 632, and 634), but denied for user 633, for not having the appropriate IAM, RBAC, ABAC privileges.

Figure 7:
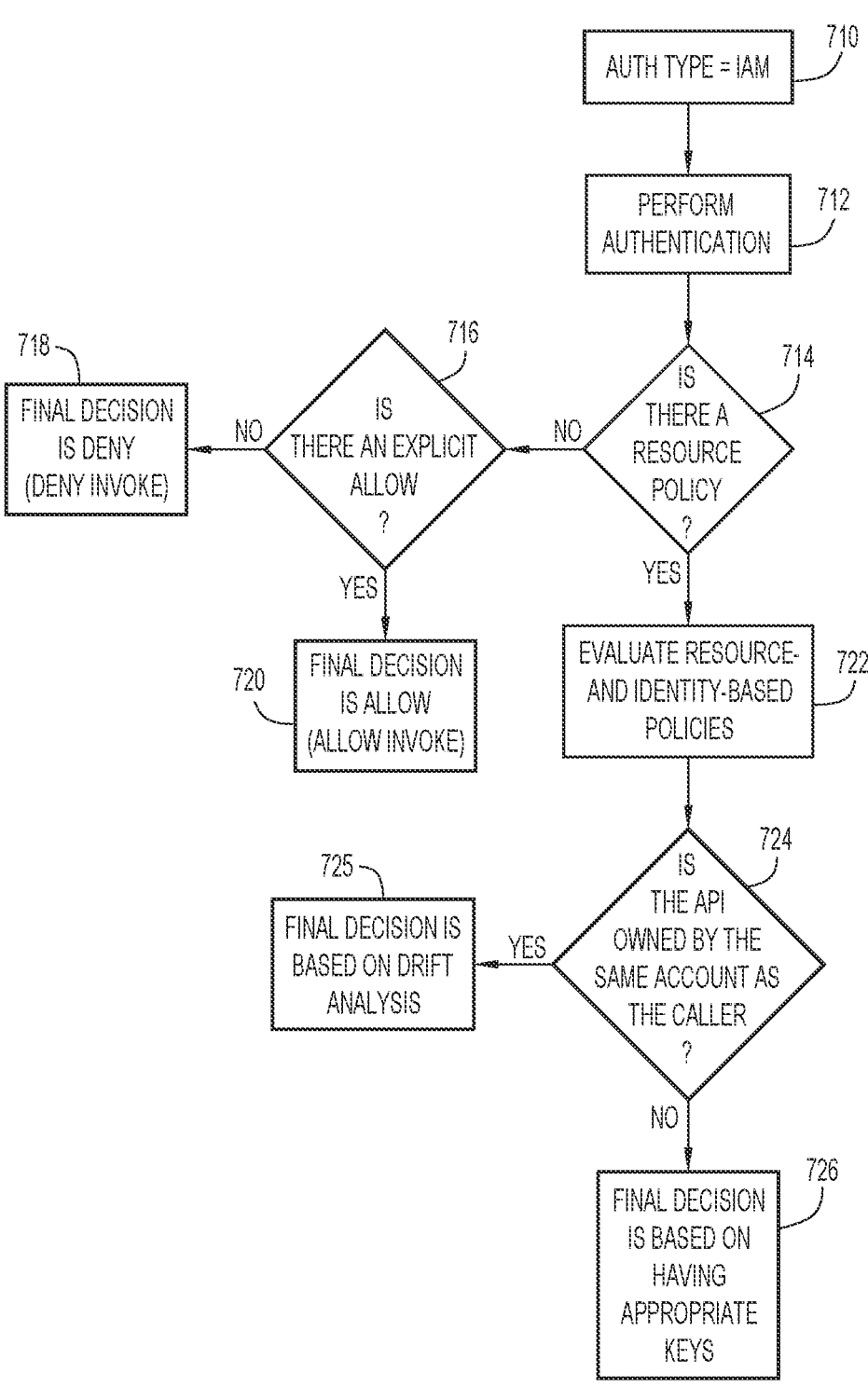
FIG. 7 is a flowchart illustrating a series of operations for allowing or denying access to a cloud database given protections provided by multi-level security logic, according to an example embodiment.

FIG. 7 is a flowchart illustrating a series of operations for allowing or denying access to a cloud database, in response to an API call, given protections provided by multi-level security logic 170, according to an example embodiment. At operation 710, it is determined that, e.g., an authorization type is IAM. At operation 712, an authentication procedure is executed given the authorization type. At operation 714, it is determined whether there is a resource policy associated with the user's persona. If not, then at operation 716, it is determined whether there is an explicit "allow" order for this user/persona being vetted. If not, then access to, e.g., target database 130 is denied, i.e., a denial to invoke the API call is applied at operation 718. If there is an explicit "allow" order, then at operation 720 the user is allowed to access target database 130.

If at operation 714, there was a resource policy associated with the user's persona, then, at operation 722, an operation is conducted to evaluate the resource- and identity-based policies. In one embodiment, and at operation 724, it is determined whether the API call is owned by a same account as the caller. If yes, then at operation 725, the decision as to whether to allow access to the particular field requested in the API call may be determined by API call flow drift analysis. As an enhanced security method, even if the IAM policy allowed the user to access the data, and the drift analysis also allowed the user to access the data, the data may nevertheless be presented to the user in an encrypted form unless the user has the appropriate keys for decryption, as indicated at operation 726.

Figure 8:
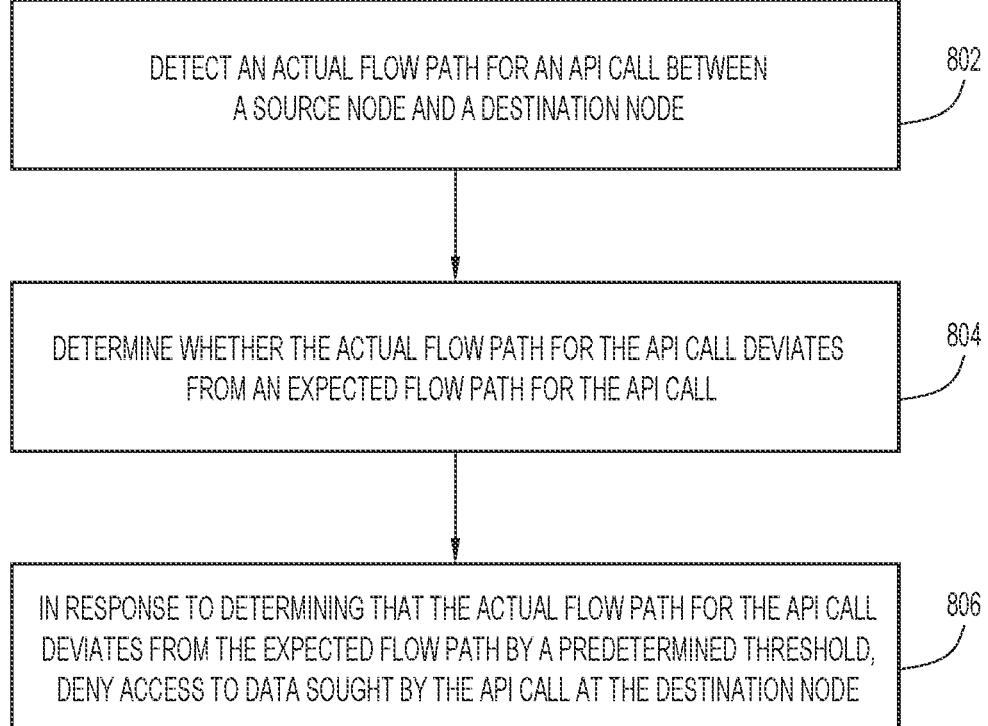
FIG. 8 is a flowchart illustrating a series of operations execute by multi-level security logic, according to an example embodiment.

FIG. 8 is a flowchart illustrating a series of operations executed by multi-level security logic 170, according to an example embodiment. At 802, an operation includes detecting an actual flow path for an API call between a source node and a destination node. At 804, an operation includes determining whether the flow path for the API call deviates from an expected flow path for the API call. And, at 806, an operation includes, in response to determining that the actual flow path for the API call deviates from the expected flow path by a predetermined threshold, denying access to data sought by the API call at the destination node.

Figure 9:
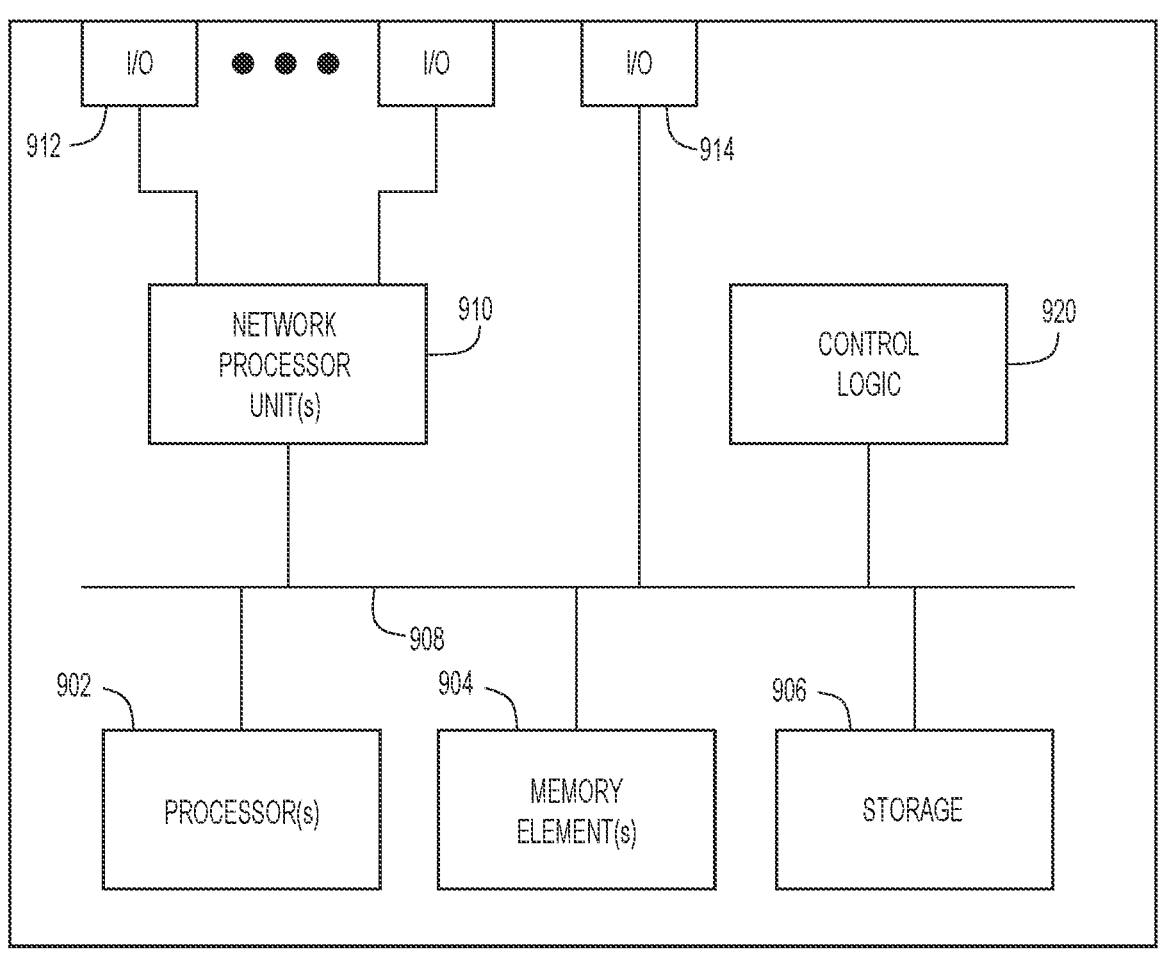
FIG. 9 is a block diagram of a computing device that may be configured to execute multi-level security logic and perform the techniques described herein, according to an example embodiment.

FIG. 9 is a block diagram of a computing device that may be configured to execute multi-level security logic 170 and perform the techniques described herein, according to an example embodiment. In various embodiments, a computing device, such as computing device 900 or any combination of computing devices 900, may be configured as any entity/ entities as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920 (which could include, for example, multi-level security logic 170). In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element (s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa) or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/ antenna array(s) now known or hereafter developed. Thus, the network processor unit(s) 910 and/or network I/O inter- face(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element (s) 904 and/or storage 906 being able to store data, software, code, instructions (e.g., processor instructions), logic, parameters, combinations thereof, or the like that are executed to carry out operations in accordance with the teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, down-loadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method may include detecting an actual flow path for an API call between a source node and a destination node, determining whether the actual flow path for the API call deviates from an expected flow path for the API call, and in response to determining that the actual flow path for the API call deviates from the expected flow path by a predetermined threshold, denying access to data sought by the API call at the destination node.

The method may further include generating a current hash value that represents the actual flow path for the API call.

In the method, the current hash value may be based on a unique value for each of the source node and the destination node, and at least one intervening node, and timestamp information representing time spent at the at least one intervening node.

The method may further include generating an expected hash value that represents the expected flow path for the API call by monitoring a plurality of API calls similar to the API call over a predetermined period of time.

The method may further include encrypting predetermined data in a target database using the expected hash value as a key or as an input to a key generator.

The method may further include storing the expected hash value as metadata along with predetermined data in a database hosted by the destination node.

In the method, the API call may be one of a read access call and a write access call directed to a target database hosted by the destination node.

The method may further include generating a first expected hash value for a read API call and a second expected hash value for a write API call.

The method may further include controlling access to the data sought by the API call at the destination node based on at least one of an Identity and Access Management (IAM) policy, a Role-Based Access Control (RBAC) policy and an Attribute Based Access Control (ABAC) policy.

The method may further include performing a reverse lookup of the API call to identify a user who initiated the API call.

In another embodiment, a device may be provided and may include an interface configured to enable network communications, a memory, and one or more processors coupled to the interface and the memory, and configured to: detect an actual flow path for an API call between a source node and a destination node, determine whether the actual flow path for the API call deviates from an expected flow path for the API call, and in response to determining that the actual flow path for the API call deviates from the expected flow path by a predetermined threshold, deny access to data sought by the API call at the destination node.

In the device, the one or more processors may be further configured to generate a current hash value that represents the actual flow path for the API call.

In the device, the current hash value may be based on a unique value for each of the source node and the destination node, and at least one intervening node, and timestamp information representing time spent at the at least one intervening node.

In the device, the one or more processors may be further configured to generate an expected hash value that represents the expected flow path for the API call by monitoring a plurality of API calls similar to the API call over a predetermined period of time.

In the device, the one or more processors may be further configured to encrypt predetermined data in a target database using the expected hash value as a key or as an input to a key generator.

In the device, the one or more processors may be further configured to store the expected hash value as metadata along with predetermined data in a database hosted by the destination node.

In the device, the one or more processors may be further configured to control access to the data sought by the API call at the destination node based on at least one of an Identity and Access Management (IAM) policy, a Role-Based Access Control (RBAC) policy and an Attribute Based Access Control (ABAC) policy.

In yet another embodiment, one or more non-transitory computer readable storage media encoded with instructions are provided and that, when executed by a processor, cause the processor to: detect an actual flow path for an API call between a source node and a destination node, determine whether the actual flow path for the API call deviates from an expected flow path for the API call, and in response to determining that the actual flow path for the API call deviates from the expected flow path by a predetermined threshold, deny access to data sought by the API call at the destination node.

The instructions, when executed by the processor, may be configured to cause the processor to generate a current hash value that represents the actual flow path for the API call, wherein the current hash value is based on a unique value for each of the source node and the destination node, and at least one intervening node, and timestamp information representing time spent at the at least one intervening node.

The instructions, when executed by the processor, may be configured to cause the processor to control access to the data sought by the API call at the destination node based on at least one of an Identity and Access Management (IAM) policy, a Role-Based Access Control (RBAC) policy and an Attribute Based Access Control (ABAC) policy.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

detecting an actual flow path for an application programming interface (API) call between a source node and a destination node;

determining whether the actual flow path for the API call deviates from an expected flow path for the API call based on a combination of (a) whether the API call is a write API call or a read API call and (b) a persona of a user who initiated the API call;

in response to determining that the actual flow path for the API call deviates from the expected flow path by a predetermined threshold, denying access to data sought by the API call at the destination node;

generating a current hash value that represents the actual flow path for the API call;

generating an expected hash value that represents the expected flow path for the API call by monitoring a plurality of API calls similar to the API call over a predetermined period of time; and encrypting predetermined data in a target database using the expected hash value as a key or as an input to a key generator.

2. The method of claim 1, wherein the current hash value is based on a unique value for each of the source node and the destination node, and at least one intervening node, and timestamp information representing time spent at the at least one intervening node.

3. The method of claim 1, further comprising storing the expected hash value as metadata along with predetermined data in a database hosted by the destination node.

4. The method of claim 1, wherein the API call is directed to a target database hosted by the destination node.

5. The method of claim 4, further comprising generating a first expected hash value for the read API call and a second expected hash value for the write API call.

6. The method of claim 1, further comprising controlling access to the data sought by the API call at the destination node based on at least one of an Identity and Access Management (IAM) policy, a Role-Based Access Control (RBAC) policy and an Attribute Based Access Control (ABAC) policy.

7. The method of claim 6, further comprising performing a reverse lookup of the API call to identify a user who initiated the API call.

8. A device comprising:

an interface configured to enable network communications;

a memory; and one or more processors coupled to the interface and the memory, and configured to:

detect an actual flow path for an application programming interface (API) call between a source node and a destination node;

determine whether the actual flow path for the API call deviates from an expected flow path for the API call based on a combination of (a) whether the API call is a write API call or a read API call and (b) a persona of a user who initiated the API call;

in response to determining that the actual flow path for the API call deviates from the expected flow path by a predetermined threshold, deny access to data sought by the API call at the destination node;

generate a current hash value that represents the actual flow path for the API call;

generate an expected hash value that represents the expected flow path for the API call by monitoring a plurality of API calls similar to the API call over a predetermined period of time; and encrypt predetermined data in a target database using the expected hash value as a key or as an input to a key generator.

9. The device of claim 8, wherein the current hash value is based on a unique value for each of the source node and the destination node, and at least one intervening node, and timestamp information representing time spent at the at least one intervening node.

10. The device of claim 8, wherein the one or more processors are further configured to store the expected hash value as metadata along with predetermined data in a database hosted by the destination node.

11. The device of claim 8, wherein the one or more processors are further configured to control access to the data sought by the API call at the destination node based on at least one of an Identity and Access Management (IAM) policy, a Role-Based Access Control (RBAC) policy and an Attribute Based Access Control (ABAC) policy.

12. The device of claim 8, wherein the API call is directed to a target database hosted by the destination node.

13. The device of claim 8, wherein the one or more processors are further configured to generate a first expected hash value for the read API call and a second expected hash value for the write API call.

14. The device of claim 8, wherein the one or more processors are further configured to perform a reverse lookup of the API call to identify a user who initiated the API call.

15. One or more non-transitory computer readable storage media encoded with instructions that, when executed by a processor, cause the processor to:

detect an actual flow path for an application programming interface (API) call between a source node and a destination node;

determine whether the actual flow path for the API call deviates from an expected flow path for the API call based on a combination of (a) whether the API call is a write API call or a read API call and (b) a persona of a user who initiated the API call;

in response to determining that the actual flow path for the API call deviates from the expected flow path by a predetermined threshold, deny access to data sought by the API call at the destination node;

generate a current hash value that represents the actual flow path for the API call;

generate an expected hash value that represents the expected flow path for the API call by monitoring a plurality of API calls similar to the API call over a predetermined period of time; and encrypt predetermined data in a target database using the expected hash value as a key or as an input to a key generator.

16. The one or more non-transitory computer readable storage media of claim 15, wherein the current hash value is based on a unique value for each of the source node and the destination node, and at least one intervening node, and timestamp information representing time spent at the at least one intervening node.

17. The one or more non-transitory computer readable storage media of claim 15, wherein the instructions, when executed by the processor, are configured to cause the processor to control access to the data sought by the API call at the destination node based on at least one of an Identity and Access Management (IAM) policy, a Role-Based Access Control (RBAC) policy and an Attribute Based Access Control (ABAC) policy.

18. The one or more non-transitory computer readable storage media of claim 15, wherein the instructions, when executed by the processor, are configured to cause the processor to store the expected hash value as metadata along with predetermined data in a database hosted by the destination node.

19. The one or more non-transitory computer readable storage media of claim 15, wherein the API call is directed to a target database hosted by the destination node.

20. The one or more non-transitory computer readable storage media of claim 19, wherein the instructions, when executed by the processor, are configured to generate a first expected hash value for the read API call and a second expected hash value for the write API call.

* * * * *